United States Patent

Paglia

[15] 3,705,537
[45] Dec. 12, 1972

[54] APPARATUS FOR INTERFACING PHOTOGRAPHIC CAMERA AND FILM CARTRIDGE

[72] Inventor: Richard Paglia, Carlisle, Mass.
[73] Assignee: Polaroid Corporation, Cambridge, Mass.
[22] Filed: April 21, 1971
[21] Appl. No.: 136,071

[52] U.S. Cl. .................................95/11 R, 95/19
[51] Int. Cl. ...................G03b 19/02, G03b 19/10
[58] Field of Search........95/11 R, 31 EL, 31 CA, 13, 95/19

[56] References Cited

UNITED STATES PATENTS

| | | |
|---|---|---|
| 3,587,425 | 6/1971 | Biber..............................95/31 EL X |
| 3,561,339 | 2/1971 | Erlichman................................95/13 |
| 2,213,768 | 9/1940 | Merriman et al...................95/31 EL |

*Primary Examiner*—Samuel S. Matthews
*Assistant Examiner*—Kenneth C. Hutchison
*Attorney*—Brown & Mikulka, Alfred E. Corrigan and Lawrence G. Norris

[57] ABSTRACT

Apparatus for interfacing a photographic camera and film cartridge. More particularly, the illustrated film cartridge contains a stack of film units of the "self-developing" type and a flat battery for energizing electrically powered components in a camera which receives the cartridge. A pair of apertures of novel configuration in the cartridge bottom wall expose terminals on the battery. The apertures and a pair of novel electrical contacts on a camera back adapted to mate with the apertures provide improved cartridge guidance and assure a good electrical union of the contacts with the battery terminals.

11 Claims, 4 Drawing Figures

INVENTOR.
RICHARD PAGLIA

PATENTED DEC 12 1972

INVENTOR.
RICHARD PAGLIA

BY Brown and Mikulka
and
John H. Coult
ATTORNEYS

APPARATUS FOR INTERFACING PHOTOGRAPHIC CAMERA AND FILM CARTRIDGE

BACKGROUND OF THE INVENTION

This invention generally concerns improvements in structure for interfacing a film cartridge which includes a disposable battery with a photographic camera having electrical components which are adapted to be energized by the battery.

This invention is considered to represent an improvement on the teachings of U.S. Pat. No. 3,543,662, owned by the assignee of this application, which discloses and claims the basic concepts of a photographic film cartridge containing a battery which is discarded with the empty cartridge and a photographic camera which receives such a cartridge and has electrical components adapted to be powered by the battery contained in the cartridge.

The reference patent teaches one skilled in the art very capably the implementation of the broader aspects of the concepts described; however, it has been found that such qualities of a system as the tactual esthetics of the cartridge insertion, wear on the interfacing cartridge-camera contacts and terminals, costs of manufacture, contact loading forces, and the cartridge guidance program necessary to assure rapid, error-free cartridge loading are of extreme importance if wide consumer acceptance of such photographic apparatus is to be obtained.

OBJECTS OF THE INVENTION

It is an object of this invention to provide improved apparatus for interfacing a photographic film cartridge including a disposable battery with a photographic camera containing electrical components adapted to be powered by such a battery.

It is another object of this invention to provide such interfacing apparatus which provides a positive and smooth cartridge insertion and withdrawal action and which assures proper and error-free guidance of the cartridge into the camera.

It is yet another object of this invention to provide such interfacing apparatus which minimizes wear of contact and terminal surfaces, which assures proper contact-loading forces, and yet which is relatively inexpensive to manufacture and assemble.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein.

DESCRIPTION OF THE PREFERRED EMBODIMENTS

Figure 1:
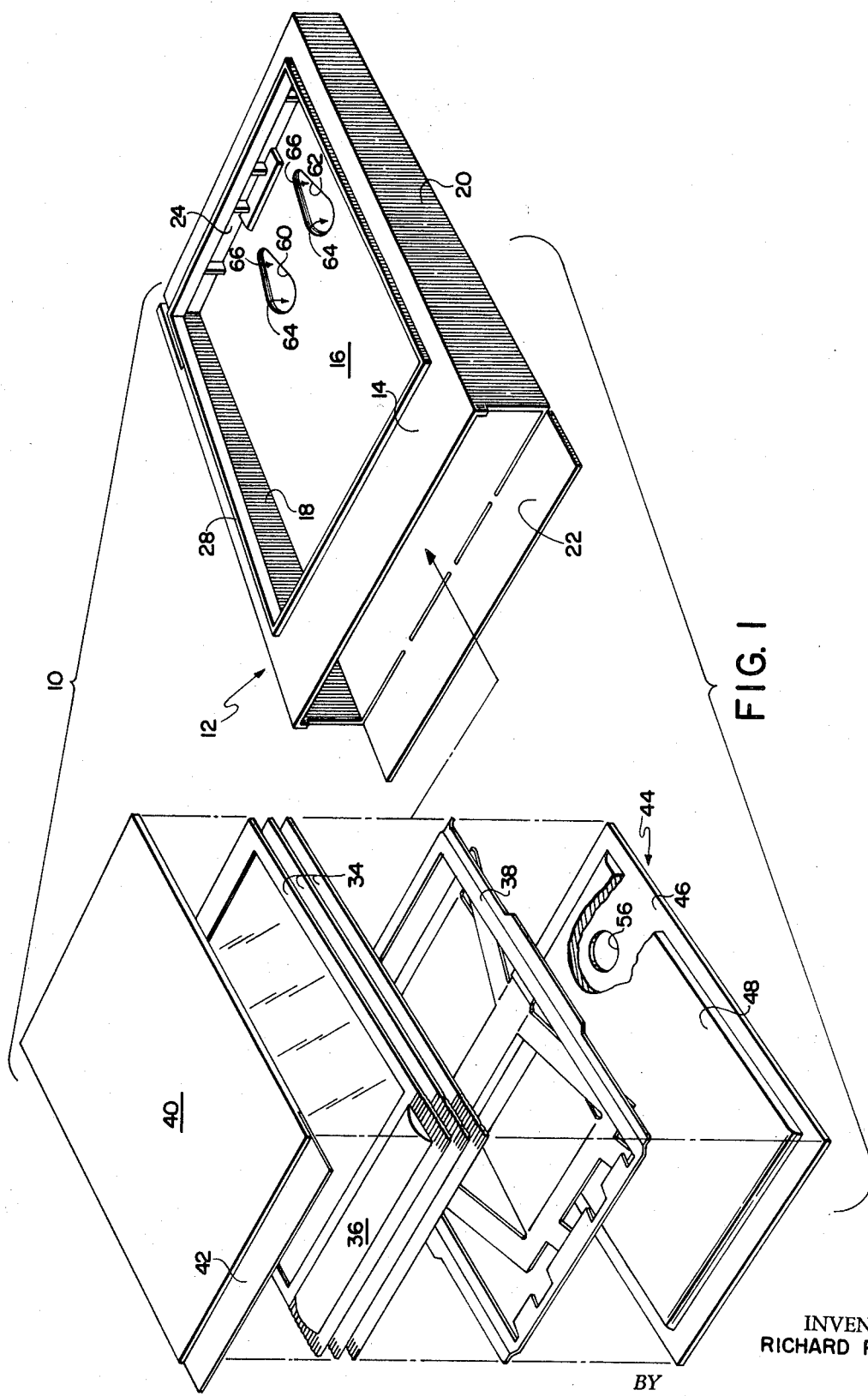
FIG. 1 is an exploded perspective view, partly broken away, showing a photographic film cartridge embodying this invention.

FIGS. 1-4 depict a preferred one of the many possible implementations of the principles of this invention. As suggested above, this invention is particularly concerned with the provision of means for interfacing a photographic film cartridge with a photographic camera adapted to receive the cartridge.

In the illustrated embodiment, a film cartridge 10 is illustrated as having a casing 12 (of injection molded plastic, for example) having a top wall 14, a bottom wall 16, side walls 18 and 20, and end walls 22, 24. The casing 10 is tapered convergently in the direction of cartridge insertion in order to accommodate asymmetries in the contents of the cartridge, and in order to prevent insertion of the wrong end of the cartridge into a camera.

The top wall 14, which may be considered the forward wall of the cartridge relative to the direction of impingement of image-carrying light, defines an exposure window 26 through which scene images are formed on photosensitive materials contained within the cartridge. The exposure window 26 is surrounded by an outwardly extending mouth 28 serving to assure a proper rest position of the cartridge when inserted into a camera film chamber and to improve the light seal of the cartridge as described in more detail below.

The casing end wall 22 is initially open during assembly of the cartridge, as shown in FIG. 1, to allow insertion of the contents of the cartridge into the casing. After insertion of the said contents, the end wall 22 is secured permanently to the casing, for example, by the use of an ultrasonic welding operation. A slit 32 formed between the upper edge of the end wall 22 and the top wall 14 of the casing 12 permits withdrawal of film units from the cartridge.

The contents of the cartridge 10 will now be discussed in some detail. The primary content is a stack of film units 34 which are here shown as being of the "self-developing" type, including a pod 36 containing processing fluid which is spread between photosensitive and receiving layers to effect development of a latent image formed on the photosensitive layer.

A spring platen 38 beneath the film units 34 acts to urge the film units 34 in succession into a proper attitude for exposure beneath the window 26. A dark slide 40 having a depending curtain 42 on one end thereof acts to prevent fogging of the film units 34 prior to use of the cartridge 10.

Figure 4:
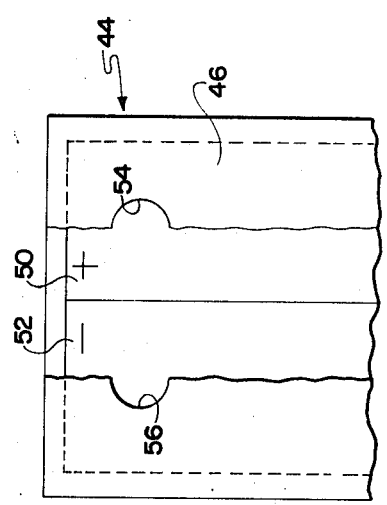
FIG. 4 is a bottom view, partly broken away and of reduced scale, of a battery shown in FIGS. 1-3.

The cartridge 10 contains a battery 44 which is disposed on the bottom wall 16 of the casing 12 beneath the spring platen 38. In the illustrated embodiment, the battery 44 is shown as comprising a card 46 which is preferably of a relatively stiff cardboard or similar material, which carries an electrochemical cell assembly 48 having (as shown in FIG. 4) positive and negative terminals 50, 52 disposed in side-by-side relationship on the underside thereof. For reasons which will become more evident hereafter, the card 46 has a pair of openings 54, 56 disposed in side-by-side relationship (relative to the direction of cartridge insertion illustrated by arrow 58 in FIG. 2). As shown clearly in FIG. 4, the openings 54, 56 are spaced such that they register with the positive and negative terminals 50, 52.

In accordance with one aspect of this invention, the bottom wall 16 of the casing 12 defines a pair of apertures 60, 62 which are registered with the openings 54, 56 in the card 46 (comprising part of the battery 44). By the described cartridge construction, the battery terminals 50, 52 are exposed through the openings 54, 56 in the battery card 46 and the registered apertures 60, 62 in the bottom wall 16 of the casing 12. For reasons which will become more evident as this description proceeds, the apertures 60, 62 each have a main portion 64 of predetermined size and taper convergently therefrom in the direction of cartridge insertion to a tip portion 66 of substantially smaller size than the main portion 64.

Figure 2:
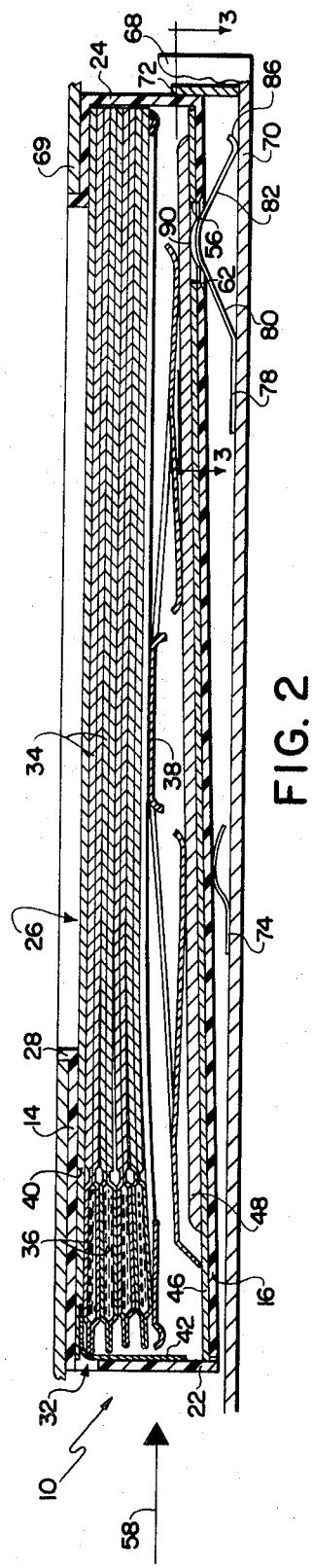
FIG. 2 is a sectional view showing the FIG. 1 cartridge as it might appear fully assembled and loaded in a camera back having interfacing apparatus constructed according to this invention.
Figure 3:
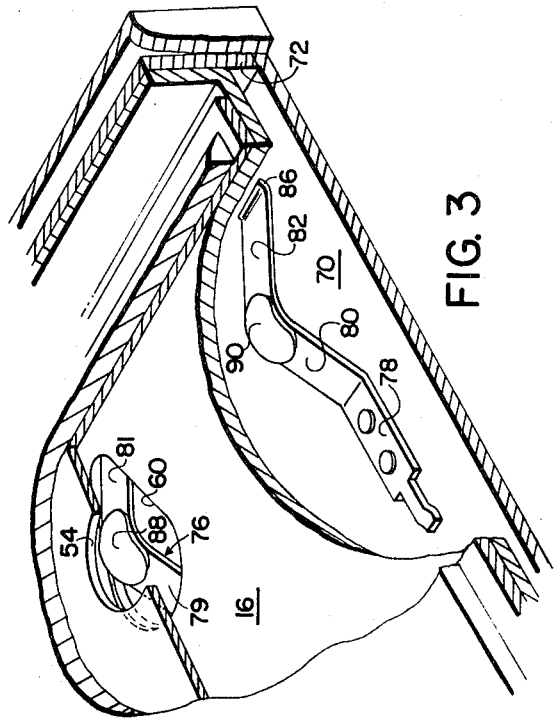
FIG. 3 is a perspective view of a cut-away generally along lines 3—3 in FIG. 2, broken away to reveal otherwise hidden components.

FIGS. 2–3 illustrate a portion of a film chamber comprising part of a back 68 for a photographic camera. The film chamber is defined in part by a forward wall 69 and a rear wall 70. A window in the forward wall 69 receives the mouth 28 on the cartridge top wall 14 to assure a proper rest location of the cartridge 10 within the film chamber.

A stop 72 limits the travel of the cartridge 10 into the film chamber. A leaf spring 74 secured to the inner surface of the chamber rear wall 70 acts to urge the cartridge 10 against the chamber forward wall 69 as the cartridge 10 is being inserted into the film chamber.

In accordance with another aspect of this invention, novel electrical contact means are provided for interfacing the camera electrical system with the battery 44 contained in the cartridge 10 and for assisting in implementing an improved cartridge guidance program. In the illustrated embodiment, novel contact means are shown in the form of a pair of electrically conductive leaf spring contacts 76, 78 each affixed at one end to the rear wall 70 of the film chamber. In the illustrated embodiment, the leaf spring contacts 76, 78 each have the general configuration of an inverted V and are mounted so as to define forward ramp portions 79, 80 extending obliquely with respect to the chamber rear wall 70. The ramp portions 79, 80 define ramps upon which a leading edge of the cartridge (represented here by the bottom edge of end wall 24) rides as the cartridge is inserted into the film chamber.

The leaf spring contacts 76, 78 by the creation of this ramping effect, direct the top wall 14 of the cartridge 10 into intimate engagement with the forward wall 69 of the film chamber and the mouth 28 within the window in wall 69 to assure that the film units 34 are situated in the focal plane of the camera objective (not shown) during exposure.

The leaf spring contacts 76, 78 are constructed to have respective rear ramp portions 81, 82 with free ends (one of which is shown at 86) which are free to slide on the rear wall 70 of the film chamber, thus allowing the leaf spring contacts 76, 78 to deflect downwardly as the leading end of the cartridge passes over them during cartridge insertion.

The rear ramp portions 81, 82 on the leaf spring contacts 76, 78 act to assist in providing a smooth and positive action as the cartridge is withdrawn from the film chamber.

The leaf spring contacts 76, 78 have at their respective apices (at the junction of the forward and rear ramp portions), rounded contact elements 88, 90 of a highly electrical conductive material such as silver. The contact elements 88, 90 are each of smaller size than the main portion 64 of the apertures 60, 62 but larger than the forward tip portion 66 of said apertures 60, 62, whereby due to the camming effect created, the contact elements 88, 90 enter the apertures 60, 62 gradually and smoothly as the cartridge 10 is inserted into the film chamber.

In operation, as a cartridge 10 is inserted into the camera film chamber, the leaf spring 74 urges the forward end of the cartridge 10 toward the forward wall 69 of the film chamber. As the forward end passes the leaf spring 74 it is apt to have a tendency to drop toward the rear wall 70 of the chamber, particularly if the camera is being held in a horizontal position as shown in the FIG. 2. However, by the lifting effect of the forward ramp portions 79, 80 of leaf spring contacts 76, 78, the forward end of the cartridge is raised, causing the mouth 28 on the cartridge top wall 14 to be inserted into the window in the chamber forward wall 69 and further assuring proper positioning of the cartridge 10 intimately against the rear surface of the chamber forward wall 69.

As the cartridge reaches the limit of its travel, as defined by stop 72, the leaf spring contacts 76, 78 (which have been deflected by the cartridge against their inherent restorative forces) return toward their undeflected state, reaching through the apertures 60, 62 in the casing bottom wall 16 and the openings 54, 56 in the battery card 46 to make firm physical and electrical engagement with the battery terminals 50, 52.

Reviewing the last stage of the cartridge insertion program it can be understood that as the tip portions 66 of the apertures 60, 62 pass over the contact elements 88, 90 the rounded contact elements 88, 90 on the (strongly biased) leaf spring contacts 76, 78 are slowly and gradually permitted to enter and pass through the main portion 64 of the apertures 60, 62 and into engagement with the battery terminals 50, 52. The smoothness of the described approach of the contact elements 88, 90 to the terminals 50, 52 is enhanced by the provision of a bevel on the edge of the apertures 60, 62 (see FIG. 2).

Upon withdrawal of the cartridge 10 from the film chamber, the described camming effect takes place in reverse, causing a smooth and positive deflection of the leaf spring contacts 76, 78 to permit a rapid and tactually pleasing cartridge withdrawal action.

The invention is not limited to the particular details of construction of the embodiments depicted, and it is contemplated that various and other modifications and applications will occur to those skilled in the art. Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. A photographic camera for receiving a film cartridge having electrical terminals exposed on a rear side thereof, comprising:

enclosure means defining a film chamber for receiving a film cartridge, said enclosure means including forward and rear wall means; and electrical contact means supported by said enclosure means and located in the path of travel of a cartridge as the cartridge is inserted into said film chamber for engaging and making electrical contact with the electrical terminals of the cartridge during insertion of the cartridge into said film chamber, said contact means including ramp means extending obliquely with respect to said rear wall means for engaging the cartridge during insertion of the cartridge into said film chamber and directing the cartridge toward said forward wall means of said film chamber.

2. A photographic camera for receiving a film cartridge having electrical terminals exposed on a rear side thereof and an exposure window on a top side thereof, comprising:

enclosure means defining a film chamber for receiving a film cartridge said enclosure means including rear wall means and forward wall means defining a window adapted to mate in registration with the window in the cartridge; and electrical contact means mounted on said rear wall means of said enclosure means in the path of travel of a cartridge as the cartridge is inserted into said film chamber for making electrical contact with the electrical terminals of the cartridge during insertion of the cartridge into said film chamber, said contact means comprising electrically conductive leaf spring means extending obliquely with respect to said rear wall means to define a ramp upon which a leading end of a cartridge rides as the cartridge is inserted into said film chamber, said leaf spring means acting to direct the top side of the cartridge against said forward wall means of said film chamber with said window in said forward wall means in registration with the window in the cartridge.

3. A photographic camera for receiving a film cartridge having an exposure window on a top side thereof and containing a plurality of film units and beneath said film units battery means having electrical terminal means exposed on a rear side of the cartridge through aperture means defined by a bottom wall of the cartridge, which aperture means tapers convergently in the direction of cartridge insertion into a camera, comprising:

enclosure means defining a film chamber for receiving a film cartridge, said enclosure means including rear wall means and forward wall means defining a window adapted to mate in registration with the window in the cartridge; and electrical spring contact means supported by said enclosure means for engaging and making electrical contact with the electrical terminal means of a cartridge through the aperture means in the bottom wall of the cartridge when a cartridge is inserted into said film chamber, said contact means including rounded contact element means of smaller size than the largest part of the aperture means in the cartridge bottom wall but larger than a tip portion of the aperture means such that said contact element means enters the aperture means gradually and smoothly.

4. The camera defined by claim 3 wherein said contact means comprises a pair of electrically conductive leaf spring members mounted side-by-side on said rear wall means and aligned with said direction of cartridge insertion, each having the general configuration of an inverted "V" with a contact element means disposed on the apex thereof, a leg of each of said leaf spring members first encountered by an inserted cartridge being anchored to said rear wall means and including a forward ramp portion, a second leg of each of said leaf spring members on the opposite side of said apex defining a rear ramp portion terminating in an end which is free to slide on said rear wall means to allow said member to deflect when engaged by the cartridge.

5. Photographic apparatus comprising:

a film cartridge having a top wall defining an exposure window and containing battery means having electrical terminals exposed through aperture means defined by a bottom wall of the cartridge, said aperture means tapering convergently in the direction of cartridge insertion into a camera; and a camera comprising:

enclosure means defining a film chamber for receiving said film cartridge, including rear wall means and forward wall means defining a window adapted to mate in registration with said exposure window in said cartridge; and electrical contact means supported by said enclosure means for engaging and making electrical contact with said electrical terminals of said cartridge through said aperture means in said bottom wall of said cartridge when said cartridge is inserted into said film chamber, said contact means having a ramp portion extending obliquely with respect to said rear wall means to define a ramp upon which a leading end of said cartridge rides as the cartridge is inserted in said film chamber, said ramp portion acting to direct said top wall of said cartridge against said forward wall means of said film chamber, said contact means including rounded contact element means of smaller size than the largest part of said aperture means in said cartridge bottom wall but larger than a tip portion of said aperture means such that said contact element means enters said aperture means gradually and smoothly.

6. The apparatus defined by claim 5 wherein said exposure window in said top wall of said film cartridge is surrounded by an outwardly extending mouth which is introduced into said window in said forward wall means of said chamber as said cartridge is directed against said forward wall means by said ramp portion of said contact means.

7. The apparatus defined by claim 6 wherein said aperture means defined by said bottom wall of said cartridge comprises two apertures and said contact means comprises two electrically conductive leaf spring members mounted on said rear wall means side-by-side relative to said direction of cartridge insertion and aligned with said direction of cartridge insertion, wherein said battery means comprises a relatively stiff card carrying battery cell means having a pair of terminals of opposite polarity constituting said terminal means disposed side-by-side in registration with said apertures and exposed to the exterior of said cartridge through a pair of openings in said card registered with said apertures.

8. The apparatus defined by claim 7 wherein said leaf spring members each have the general configuration of an inverted "V" with a contact element means disposed on the apex thereof, a leg of each of said leaf spring members first encountered by an inserted cartridge being anchored to said rear wall means and including said ramp portion, a second leg of each of said leaf spring members on the opposite side of said apex defining a rear ramp portion terminating in an end which is free to slide on said rear wall means to allow said members to deflect when engaged by said cartridge.

9. A film cartridge for storing a plurality of film units in stacked relationship for successive exposure in a photographic camera having in a film chamber electrical contact element means, comprising:
   a relatively flat, box-like casing having spaced walls including a top wall defining an exposure window and a bottom wall defining aperture means; and
   battery means adjacent said bottom wall and having thereon electrical terminal means registered with said aperture means in said bottom wall and exposed to the exterior of said cartridge,
   said aperture means having a main portion of predetermined size which is larger than said contact element means and which tapers convergently in the direction in which said cartridge is inserted into a camera to a tip portion of smaller size than said contact element means, such that upon insertion of said cartridge into a camera having such contact element means said contact element means enters said aperture means gradually and smoothly.

10. The film cartridge defined by claim 9 wherein said aperture means has a beveled edge to enhance the smoothness of said entry of said contact element means into said aperture means.

11. The film cartridge defined by claim 10 wherein said aperture means defined by said bottom wall of said cartridge comprises two apertures disposed side-by-side relative to the direction of cartridge insertion into a camera, wherein said battery means comprises a relatively stiff card carrying battery cell means having a pair of terminals of opposite polarity disposed side-by-side in registration with said apertures and exposed to the exterior of said cartridge through a pair of openings in said card registered with said apertures.

* * * * *